(12) United States Patent
Kuroda et al.

(10) Patent No.: US 11,535,302 B2
(45) Date of Patent: Dec. 27, 2022

(54) FRONT VEHICLE-BODY STRUCTURE OF VEHICLE

(71) Applicant: MAZDA MOTOR CORPORATION, Hiroshima (JP)

(72) Inventors: Susumu Kuroda, Aki-gun (JP); Hiroshi Sogabe, Aki-gun (JP); Shunsuke Hirai, Aki-gun (JP); Kazuki Yamauchi, Aki-gun (JP); Minoru Sunada, Aki-gun (JP); Ryo Asahi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 113 days.

(21) Appl. No.: 17/167,973

(22) Filed: Feb. 4, 2021

(65) Prior Publication Data
US 2021/0309301 A1 Oct. 7, 2021

(30) Foreign Application Priority Data
Apr. 1, 2020 (JP) .............................. JP2020-065780

(51) Int. Cl.
*B62D 25/08* (2006.01)
*B62D 25/14* (2006.01)
(Continued)

(52) U.S. Cl.
CPC ........... *B62D 25/081* (2013.01); *B62D 25/10* (2013.01); *B62D 25/14* (2013.01); *B60R 21/34* (2013.01);
(Continued)

(58) Field of Classification Search
CPC ...... B62D 25/081; B62D 25/10; B62D 25/14; B62D 21/152; B62D 25/082;
(Continued)

(56) References Cited

U.S. PATENT DOCUMENTS

| 4,976,491 A | 12/1990 | Hashimoto et al. |
| 2015/0028629 A1* | 1/2015 | Sasaki .................. B62D 25/082 |
| | | 296/192 |

FOREIGN PATENT DOCUMENTS

| DE | 20 2013 004205 U1 | 8/2014 |
| JP | 2004-262290 A | 9/2004 |

(Continued)

OTHER PUBLICATIONS

The extended European search report issued by the European Patent Office dated Aug. 16, 2021, which corresponds to European Patent Application No. 21160947.4-1009 and is related to U.S. Appl. No. 17/167,973.

*Primary Examiner* — D Glenn Dayoan
*Assistant Examiner* — Dana D Ivey
(74) *Attorney, Agent, or Firm* — Studebaker & Brackett PC

(57) ABSTRACT

There are provided a cowl provided to support a front windshield in an inclined state where a rear side of the front windshield is located at a higher level than a front side of the front windshield and forming a lower edge of an opening portion for arranging the front windshield and a bonnet provided in front of and above the cowl. An upper portion of the cowl comprises a first face portion to which the front windshield adheres and an inclined second face portion which extends obliquely rearwardly-and-downwardly from the first face portion, and a front end of the first face portion is positioned on a rearward side, in a vehicle longitudinal direction, of a rear end of the bonnet.

4 Claims, 10 Drawing Sheets

(51) Int. Cl.
  *B62D 25/10*      (2006.01)
  *B62D 21/15*      (2006.01)
  *B60R 21/34*      (2011.01)
  *B62D 25/12*      (2006.01)
  *B60R 21/38*      (2011.01)

(52) U.S. Cl.
  CPC ......... *B60R 21/38* (2013.01); *B60R 2021/343* (2013.01); *B62D 21/15* (2013.01); *B62D 21/152* (2013.01); *B62D 25/08* (2013.01); *B62D 25/082* (2013.01); *B62D 25/088* (2013.01); *B62D 25/12* (2013.01)

(58) Field of Classification Search
  CPC ...... B62D 25/088; B62D 25/08; B62D 25/12; B62D 21/15; B60R 21/38; B60R 21/34; B60R 2021/343
  USPC .......................................................... 296/92
  See application file for complete search history.

(56) References Cited

FOREIGN PATENT DOCUMENTS

| | | | |
|---|---|---|---|
| JP | 2009-051342 A | | 3/2009 |
| JP | 2012006537 A | * | 1/2012 |
| JP | 2012006537 A | | 1/2012 |

* cited by examiner

FRONT VEHICLE-BODY STRUCTURE OF VEHICLE

BACKGROUND OF THE INVENTION

The present invention relates to a front vehicle-body structure of a vehicle which comprises a cowl provided to support a front windshield in an inclined state where a rear side of the front windshield is located at a higher level than a front side of the front windshield and forming a lower edge of an opening portion for arranging the front windshield and a bonnet (engine hood) provided in front of and above the cowl.

In general, various countermeasures have been taken from viewpoints of protection of a pedestrian when the front vehicle-body structure of the vehicle collides with the pedestrian because there is a concern that a head portion of the pedestrian may hit against a part of the vehicle body which extends from a rear portion of the bonnet to a lower end of the front windshield, i.e., a vehicle-body portion near the lower end of the front windshield.

For example, a front vehicle-body structure in which the cowl provided near the lower end of the front windshield is configured to have a so-called open cowl structure (not having a closed-cross section) which can absorb collision impact properly is known.

Meanwhile, it is preferable that the rigidity of the cowl be increased in order to improve the vehicle-body rigidity or reduce vibrations of the front windshield or the like during vehicle traveling. Japanese Patent Laid-Open Publication No. 2012-6537 discloses a structure in which the cowl has the closed-cross section structure but this cowl structure is configured such that the area near the lower end of the front wind shield is easily crushed and deformed in the vehicle collision.

In this structure of the patent document, however, the rigidity of the above-described area may improperly decrease, so that there is room for further consideration.

SUMMARY OF THE INVENTION

The present invention has been devised in view of the above-described problem, and an object of the present invention is to provide a front vehicle-body structure of a vehicle which can compatibly achieve the pedestrian protection and the rigidity securement attained by the cowl closed-cross section structure at a high level.

The present invention is a front vehicle-body structure of a vehicle, comprising a front windshield, a cowl provided to support the front windshield in an inclined state where a rear side of the front windshield is located at a higher level than a front side of the front windshield and forming a lower edge of an opening portion for arranging the front windshield, and a bonnet provided in front of and above the cowl, wherein the cowl comprises a first face portion to which the front windshield adheres and an inclined second face portion which extends obliquely rearwardly-and-downwardly from the first face portion, and a front end of the first face portion is positioned on a rearward side, in a vehicle longitudinal direction, of a rear end of the bonnet.

According to the present invention, since the second portion is configured in an inclined shape such that its rear side is located at a lower level, in a case where the head portion of the pedestrian hits against a front portion of the front windshield, the head portion moves on the second face portion obliquely rearwardly-and-downwardly, so that the collision impact of the head portion of the pedestrian against the cowl can be reduced properly.

Further, since the front end of the first face portion is positioned on the rearward side, in the vehicle longitudinal direction, of the rear end of the bonnet, in a case where the head portion of the pedestrian hits against an area in front of the cowl, the collision impact can be properly reduced by downward displacement (deformation) of the bonnet.

Accordingly, the rigidity of the cowl itself can be secured and also the pedestrian-protection performance can be secured.

In an embodiment of the present invention, the cowl is configured to have a closed-cross section portion extending in a vehicle width direction which is formed by faces including the first face portion and the second face portion.

According to this embodiment, the rigidity of the cowl can be secured.

In another embodiment of the present invention, a bottom face portion which forms a bottom face of the closed-cross section portion of the cowl is configured to extend obliquely rearwardly-and-downwardly.

According to this embodiment, the pedestrian-protection performance can be secured, securing the rigidity of the cowl by providing a sufficient sectional area, in a direction perpendicular to the vehicle width direction, of a closed-cross section space of the cowl.

In another embodiment of the present invention, the front vehicle-body structure of the vehicle further comprises a dash panel provided below the cowl and to extend downwardly from a lower portion of the cowl, wherein an upper end portion of the dash panel is joined to the bottom face portion of the closed-cross section portion of the cowl from below, and the closed-cross section portion is provided with a protrusion portion which is configured to protrude rearwardly beyond a joint portion of the upper end portion of the dash panel and the bottom face portion.

According to this embodiment, by providing the protrusion portion at a rear part of the closed-cross section portion, a distance, in a vehicle vertical direction, between the bottom face portion and the second face portion of the cowl can be large compared to a structure where the protrusion portion is not provided, so that a closed-cross section space of the rear part of the closed-cross section portion can be properly large.

In another embodiment of the present invention, an imaginary straight line connecting a lower end and an upper end of the second face portion is configured to cross the front windshield.

According to this embodiment, the vibration of the front windshield which occurs in a direction crossing a surface direction of the front windshield can be properly suppressed.

In another embodiment of the present invention, a front face portion of the cowl is configured to extend downwardly from the front end of the first face portion in a vertical-wall shape.

According to this embodiment, plastic deformation, in a downward direction, of the bonnet is not hindered and a sufficient sectional area, in the direction perpendicular to the vehicle width direction, of the closed-cross section portion can be properly provided.

Thus, according to the front vehicle-body structure of the vehicle of the present invention, the pedestrian protection and the rigidity securement attained by the cowl closed-cross section structure can be compatibly achieved at the high level.

The present invention will become apparent from the following description which refers to the accompanying drawings.

DETAILED DESCRIPTION OF THE INVENTION

Figure 1:
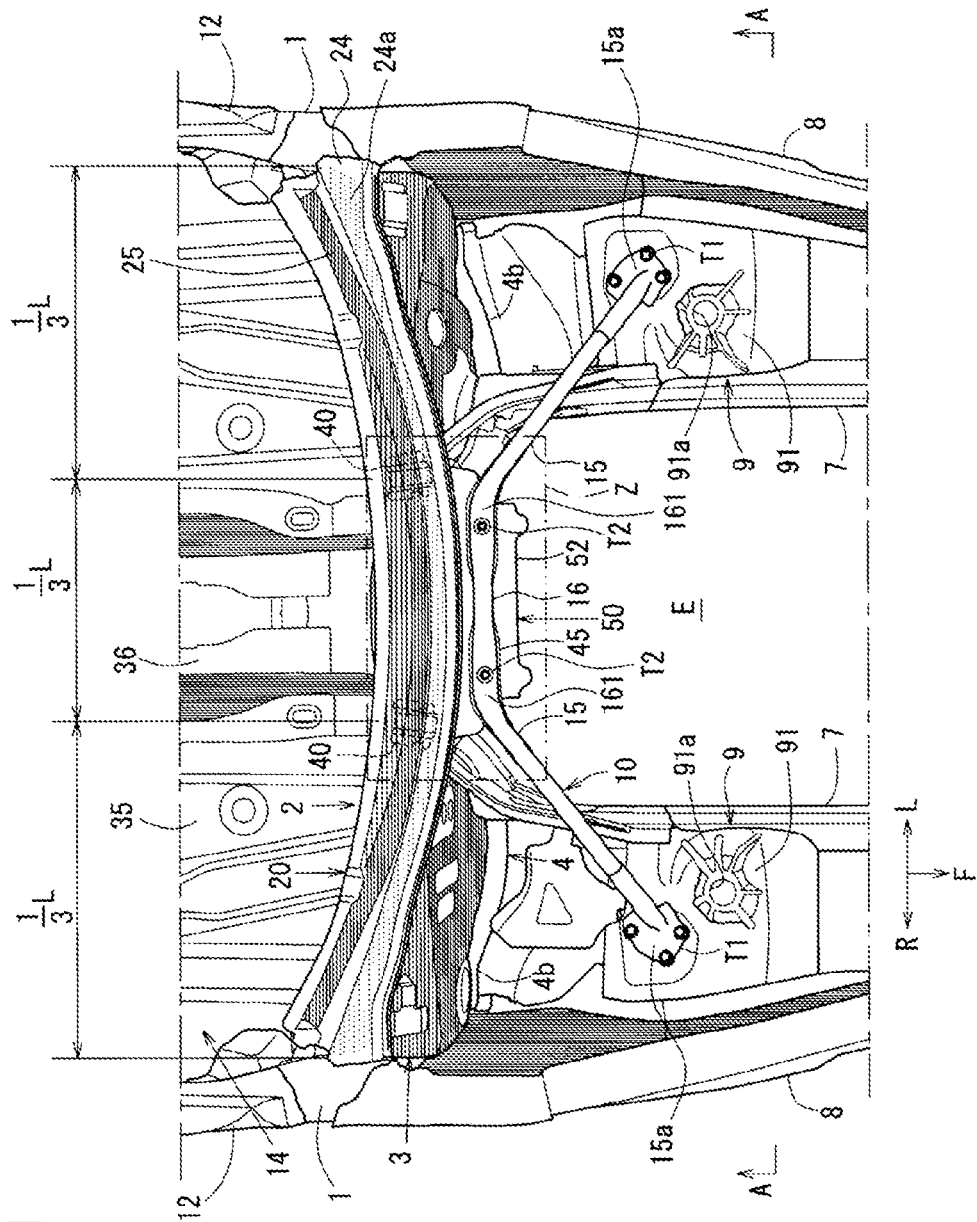
FIG. 1 is a plan view showing a major part of a front vehicle-body structure of a vehicle of a present embodiment.
Figure 2:
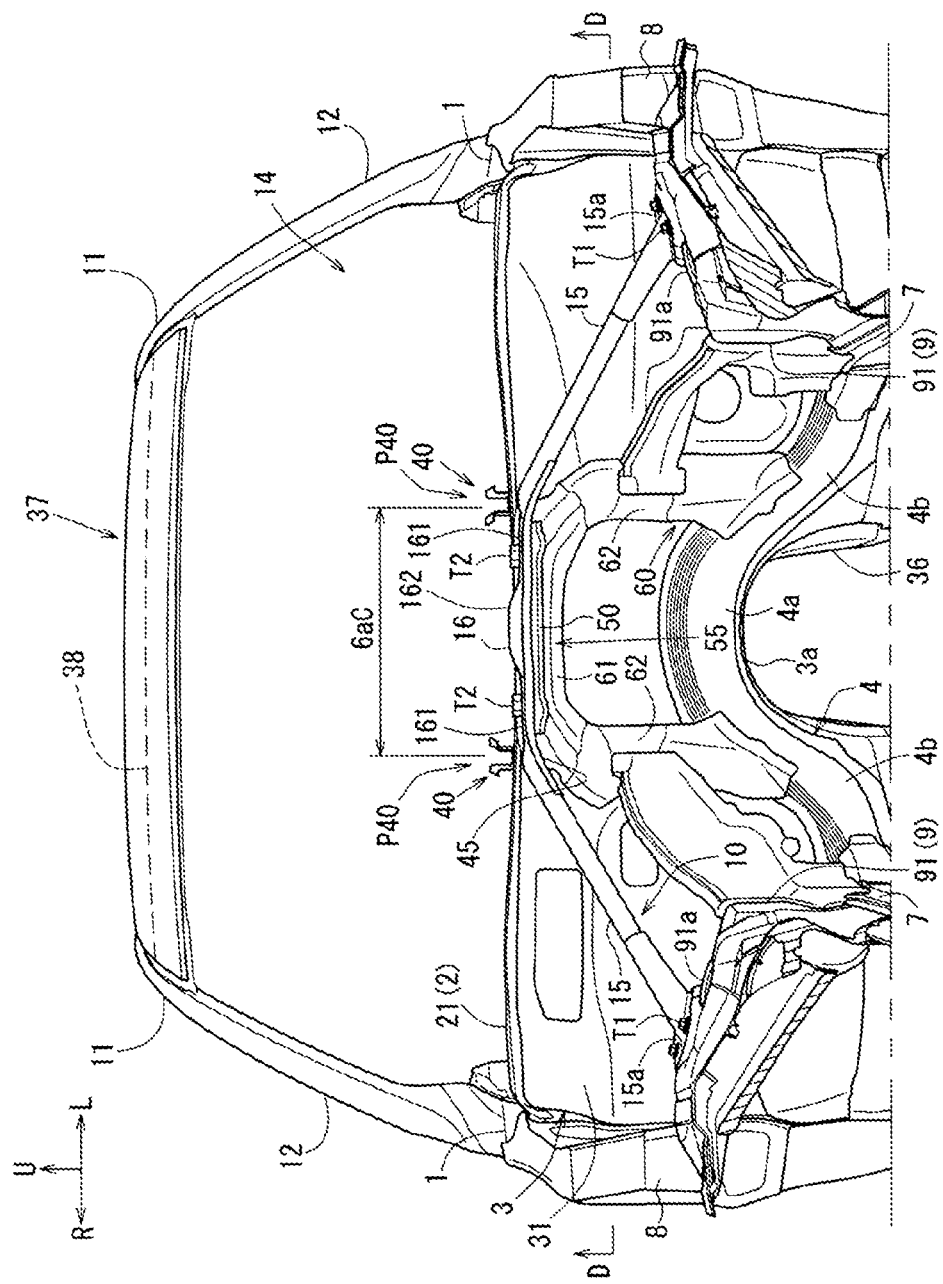
FIG. 2 is a sectional view taken along line A-A of FIG. 1.
Figure 3:
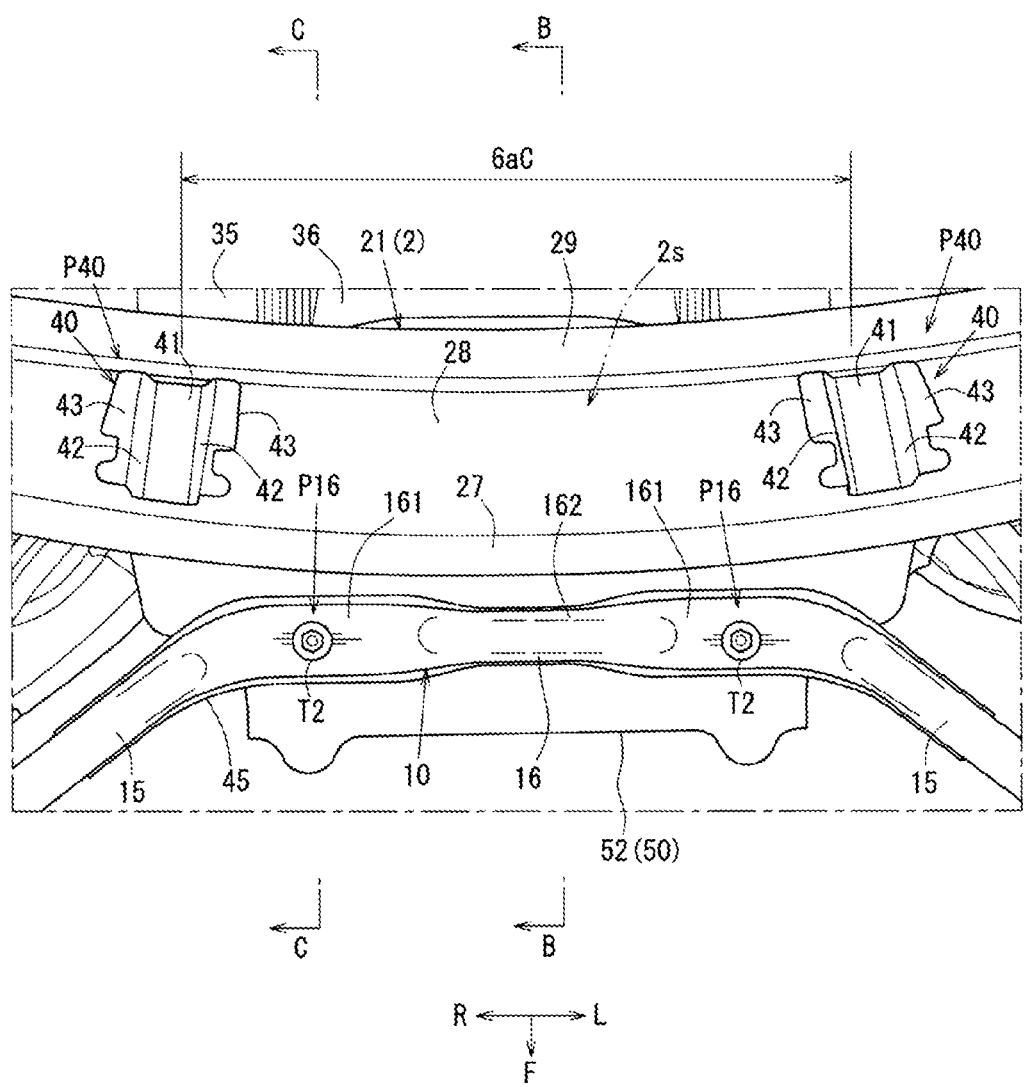
FIG. 3 is an enlarged view of an area Z of FIG. 1 where a cowl panel upper is removed.

Hereafter, an embodiment of the present invention will be described specifically referring to the drawings. In the drawings, an arrow F shows a vehicle front (forward) side, an arow R shows a vehicle right (rightward) side, and an arrow L shows a vehicle left (leftward) side. In FIGS. 1 and 2, illustration of a bonnet (engine hood) 5 and a front windshield 6 is omitted, and FIGS. 2 and 3 show respective states where a cowl upper panel 20 is removed.

As shown in FIGS. 1 and 2, a front vehicle-body structure of a vehicle of the present embodiment comprises a pair of right-and-left hinge pillars 1, a cowl 2, a dash panel 3, a dash cross member 4, the bonnet 5 (see FIG. 5), a front windshield 6 (see FIG. 5), a pair of right-and-left front side frames 7 (see FIG. 1), a pair of right-and-left apron reinforcements 8, a pair of right-and-left front suspensions 9, and a tower bar 10.

The right-and-left hinge pillars 1 are provided to be separated from each other having a distance corresponding to a nearly entire width of a vehicle body. Herein, a front pillar 12 is provided to extend rearwardly-and-upwardly from an upper end of the hinge pillar 1 to a roof side rail 11.

The cowl (in other word, "cowl box") 2 extends in the vehicle width direction between respective upper end portions of the right-and-left hinge pillars 1, and is configured in a nearly arc shape (arch shape) such that an central portion, in the vehicle width direction, thereof protrudes forwardly in a plan view (see FIG. 1).

Figure 5:
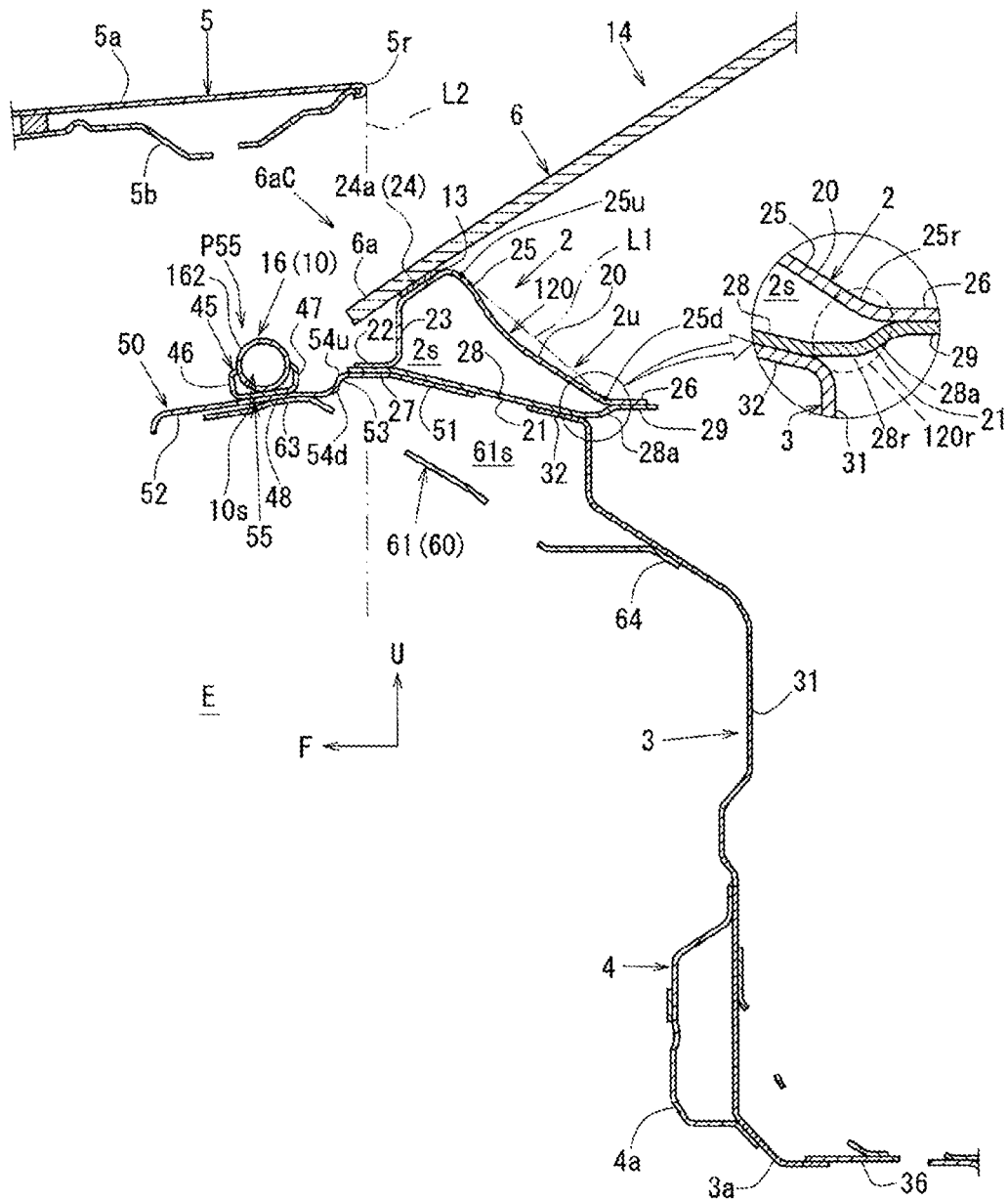
FIG. 5 is a sectional view taken along line B-B of FIG. 3.

As shown in FIGS. 1 and 5, the cowl 2 is configured to have a width, in the vehicle width direction, thereof which is slightly longer than a length of a lower edge 6a (hereafter, referred to as "windshield lower edge 6a") of the front windshield 6 (see FIG. 5) which extends in the vehicle width direction. As shown in FIG. 5, the windshield lower edge 6a adheres to the cowl 2 via a window rubber 13. This adhesion face 24a (adhesion area) is formed over a nearly entire width, in the vehicle width direction, of the windshield lower edge 6a. Herein, the adhesion face 24a is shown by a dotted area of a first face portion 24, which will be described later, of the cowl 2 in FIG. 1.

Figure 4:
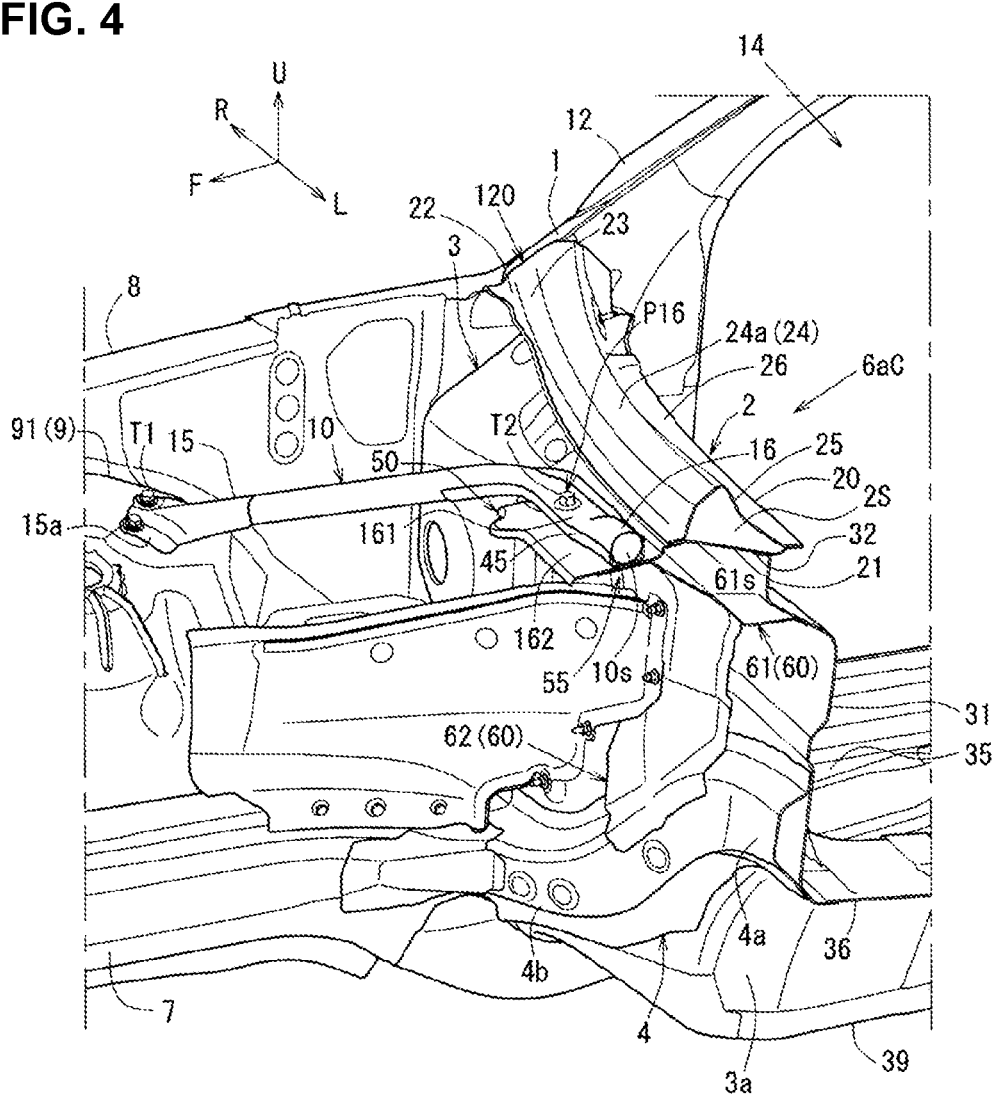
FIG. 4 is a perspective sectional view of an end portion taken along line B-B of FIG. 3.

Further, as shown in FIGS. 4 and 5, the cowl 2 comprises a cowl upper panel 20 and a cowl lower panel 21, and has a closed-cross section portion 120 in which a closed-cross section space 2s extending in the vehicle width direction is formed.

As shown in FIGS. 1, 2, 4 and 5, the dash panel 3 is provided to extend in the vehicle width direction and in the vertical direction in a vertical-wall shape between the right-and-left hinge pillars 1 such that it partitions a cabin from an engine room E, and a lower portion of the dash panel 3 extends obliquely downwardly-and-rearwardly (see FIGS. 4 and 5).

Herein, as shown in FIGS. 1 and 4, a floor panel 35 which forms a bottom face of the cabin is joined to a rear end of the lower portion of the dash panel 3. This floor panel 35 extends substantially horizontally in the vehicle width direction and in the vehicle longitudinal direction and is formed integrally with a floor tunnel 36 which protrudes toward a cabin inside (upwardly) at a central portion, in the vehicle width direction, of the floor panel 35 and extends in the vehicle longitudinal direction.

As shown in FIGS. 4 and 5, the dash panel 3, which is provided below the cowl 2, comprises a dash-panel body portion 31 which extends in the vehicle vertical direction in a vertical-wall shape and an upper-end flange portion 32 which extends forwardly from an upper end of the dash-panel body portion 31, and the upper-end flange portion 32 is joined to a bottom face portion 28 of the cowl lower panel 21 of the cowl 2 from a lower side.

Further, as shown in FIGS. 2 and 4, a lower-end edge of a central area, in the vehicle width direction, of the dash panel 3 is configured to protrude upwardly in a nearly inverse-U shape along a shape of the floor tunnel 36 extending in the vehicle longitudinal direction inside the cabin in an elevational view. This lower-end edge extending along the shape of the floor tunnel 36 is a tunnel-corresponding portion 3a.

The dash cross member 4 interconnects, as shown in FIGS. 2, 4 and 5, the lower portions of the right-and-left hinge pillars 1 in the vehicle width direction along a lower-end edge of a front face part of the dash-panel body portion 31. The dash cross member 4 is configured to have a nearly hat-shaped cross section which protrudes forwardly so as to form a closed-cross section together with the dash panel 3 in a vertical cross section along the vehicle vertical direction and the vehicle longitudinal direction, specific illustration of which is omitted here.

More specifically, the dash cross member 4 comprises, as shown in FIGS. 2 and 4, a gate-shaped portion 4a which protrudes upwardly along the tunnel corresponding portion 3a of the dash panel 3 and right-and-left horizontal extension portions 4b which extend outwardly, in the vehicle width direction, toward the right-and-left hinge pillars 1 from respective lower ends of the gate-shaped portion 4a, which are formed integrally.

As shown in FIG. 4, respective rear ends of right-and-left front side frames 7, which will be described later, are joined to respective midway portions, in the vehicle width direction, of the right-and-left horizontal extension portions 4b provided at both sides of the dash cross member 4 (herein, FIG. 4 shows a connection portion of the right-side front side frame 7 and the right-side dash cross member 4 only).

As shown in FIG. 5, the bonnet (bonnet hood or engine hood) 5 covers over an upper part of the engine room E so as to open or close the engine room E, and comprises a bonnet outer panel 5a which constitutes an outer surface of the bonnet 5 and a bonnet inner panel 5b which constitutes a surface positioned on the side of the engine room E. The bonnet outer panel 5a is joined to the bonnet inner panel 5b by hemming process in which an outer peripheral edge 5*b* is caulked by an bent outer peripheral edge of the bonnet outer panel 5*a*.

The bonnet 5 is fixed to the vehicle body via a bonnet hinge, not illustrated, at both sides, in the vehicle width direction, of its rear end so that the bonnet 5 can be opened or closed with a support point positioned at its rear end portion.

The front windshield 6 is a so-called front window glass, and provided to cover an opening portion for front-window arrangement 14 (see FIGS. 1 and 2) which is formed at the vehicle body and to extend obliquely upwardly-and-rearwardly in back of the bonnet 5 as shown in FIG. 5. The front windshield 6 is not limited to a glass-made one but may be made of reinforced plastic which is transparent.

The front windshield 6 is fixed to an edge part of the opening portion for front-window arrangement 14. Specifically, an upper edge of the front windshield 6 is supported at a front header 38 (see FIG. 2) which forms an upper edge of the opening portion for front-window arrangement 14. Herein, the front header 38 is a vehicle-body frame member which extends in the vehicle width direction along a front edge of a roof portion 37. Further, right-and-left side edges of the front windshield 6 are supported at the front pillars 12 which form right-and-left side edges of the opening portion for front-window arrangement 14, and the lower edge 6*a* of the windshield 6 is supported at the cowl 2 which forms a lower-side edge of the opening portion for front-window arrangement 14 as described above.

As shown in FIGS. 1 and 4, the front side frames 7 extend in the vehicle longitudinal direction at right-and-left both sides of the engine room E.

A crash can is attached to a front end of the front side frame 7 via a set plate, which is not illustrated.

As shown in FIG. 4, a rear end of the front side frame 7 is joined to the lower portion of the dash panel 3, and its rear side is joined to a floor side frame 39 which extends in the vehicle longitudinal direction below the floor panel 35.

As shown in FIGS. 1, 2 and 4, the apron reinforcement 8 extends in the vehicle longitudinal direction at a position which is located on the outward side, in the vehicle width direction, of and above the front side frame 7, and its rear end is joined to an upper portion of the hinge pillar 1.

The hinge pillar 1, the front side frame 7, and the apron reinforcement 8 are respectively a vehicle-body frame member which has a closed-cross section extending in each extension direction.

The suspension tower 9 is provided between respective rear portions of the front side frame 7 and the apron reinforcement 8. An upper portion of the suspension tower 9 is formed by a front suspension housing 91 as a suspension-tower upper panel. The front suspension housing 91 is joined to the rear portions of the front side frame 7 and the apron reinforcement 8 such that it extends between these rear portions. Further, the front suspension housing 91 is provided with a damper attachment portion 91*a* which is of a nearly circular shape and to which an upper end of a front suspension damper (not illustrated) is attached (see FIGS. 1 and 2).

The tower bar 10 extends in the vehicle width direction so as to connect to the right-and-left suspension towers 9 as shown in FIGS. 1-5. The tower bar 10 extends in the vehicle width direction such that a central portion, in the vehicle width direction, thereof goes around toward a central portion, in the vehicle width direction, of the cowl 2 (rearwardly). The central portion, in the vehicle width direction, of the tower bar 10 is connected to the central portion, in the vehicle width direction, of the cowl 2 via a bracket 50 which will be described later.

That is, since the cowl 2 has the closed-cross section structure having the closed-cross section space 2*s* extending in the vehicle width direction as described above (FIGS. 4 and 5), and the tower bar 10 is joined to the cowl 2 not directly but via the bracket 50 in an area near a front side of the central portion (6*a*C), in the vehicle width direction, of the cowl 2 (see FIGS. 3 and 4).

The tower bar 10 comprises a pair of right-and-left bar outward-side portions 15 and a bar central portion 16, and its nearly-entire part (excluding right-and-left flanges 15*a* and fastening portions 161, described later) is formed in a cylindrical shape (pipe shape) and integrally formed by a single member which extends continuously in the vehicle width direction (longitudinal direction). Herein, the tower bar 10 is arranged substantially horizontally.

The pair of right-and-left bar outward-side portions 15 extend substantially linearly from the front suspension housings 91 of the suspension towers 9 toward the rearward side, in the vehicle longitudinal direction, and the central side, in the vehicle width direction.

As shown in FIG. 3, the bar central portion 16 extends substantially linearly in the vehicle width direction nearly in parallel to the central portion (6*a*C), in the vehicle width direction, of the cowl 2 in an area located in front of the central portion (6*a*C) of the cowl 2 such that the bar central portion 16 interconnects rear ends of the right-and-left bar outward-side portions 15.

As shown in FIGS. 1, 2 and 4, the tower bar 10 is fixed to the respective front suspension housings 91 of the right-and-left suspension towers 9 by fastening members T1 (bolts and nuts). Specifically, the flanges 15*a* for attachment of the suspension towers 9 are integrally formed at respective outward ends, in the vehicle width direction, (front ends) of the pair of right-and-left bar outward-side portions 15 of the tower bar 10. The right-and-left flange portions 15*a* are fastened to respective portions of their corresponding front suspension housings 91 which are located behind the damper attachment portions 91*a* by the fastening members T1.

Further, as shown in FIGS. 4-6 and 8, the cowl upper panel 20 of the cowl 2 is configured to have an open-cross section which is opened downwardly. Specifically, the cowl upper panel 20 comprises a front-side flange portion 22 which extends substantially horizontally in the vehicle longitudinal direction, a front face portion 23 which rises upwardly from a rear end of the front-side flange portion 22, a first face portion 24 which extends obliquely upwardly-and-rearwardly from an upper end of the front face portion 23, a second face portion 25 which extends obliquely downwardly-and-rearwardly from a rear end of the first face portion 24, and a rear-side flange portion 26 which extends substantially horizontally in the vehicle longitudinal direction from a rear end of the second face portion 25, which are formed integrally.

That is, the cowl 2 is configured such that its upper face portion 2U is formed by the first face portion 24 and the second face portion 25. A corner portion of the first face portion 24 and the second face portion 25 is formed in a curved shape which is curved upwardly in a sectional view.

The first face portion 24 has an inclination angle which corresponds to an inclination angle of the front windshield 6, and is provided with the above-described adhesion face 24*a* where the windshield lower edge 6*a* adheres as described above.

The second face portion 25 extends obliquely rearwardly-and-downwardly over its entire length such that its rear end is located at a position which is located below the level of the front-side flange portion 22 and on the rearward side, in the vehicle longitudinal direction, of the vertical-wall shaped dash-panel body portion 31.

The inclination angle of the second face portion 25 is set so as to correspond (be equivalent) to an angle of a pedestrian's head portion moving from the forward- and upper side relative to the cowl 2 in a pedestrian's collision.

That is, the cowl 2 is not configured to be easily crushed by bending causing point or the like in the collision but configured such that its rear portion (the second face portion 25) is inclined rearwardly-and-downwardly so that an collision object (pedestrian's head portion) can be dodged. Further, the front portion of the cowl 2 is arranged such that plastic deformation, in the downward direction, of the bonnet 5 is not hindered. According to the cowl 2 of the present embodiment, the pedestrian-protection performance can be secured, securing the rigidity of the cowl 2 itself. Herein, the second face portion 25 of the present embodiment is configured such that its front-side part has a steeper gradient that its rear-side part (FIG. 5).

Hereafter, as shown by a major-part enlarged portion of FIG. 5, an extension part of the second face portion 25 which extends rearwardly beyond an upper end of the dash-panel body portion 31 (a rear end of the upper-end flange portion 32) will be described as a "rearward extension part 25r."

Further, as shown in FIG. 5, the second face portion 25 is configured such that an imaginary straight line L1 which connects a lower end 25d and an upper end 25u of the second face portion 25 crosses (nearly perpendicularly in the present embodiment) the front windshield 6 in the sectional view. Thereby, the second face portion 25 can effectively receive and suppress the vibration of the front windshield 6 which occurs in a direction crossing a surface direction of the front windshield 6.

Figure 6:
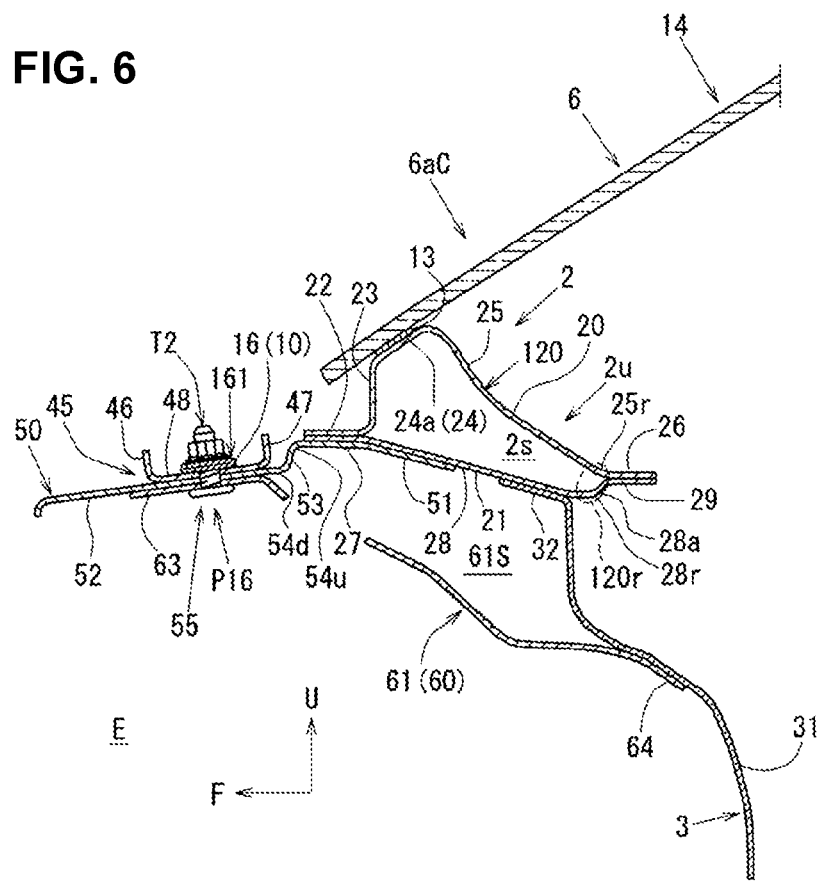
FIG. 6 is a sectional view taken along line C-C of FIG. 3.
Figure 8:
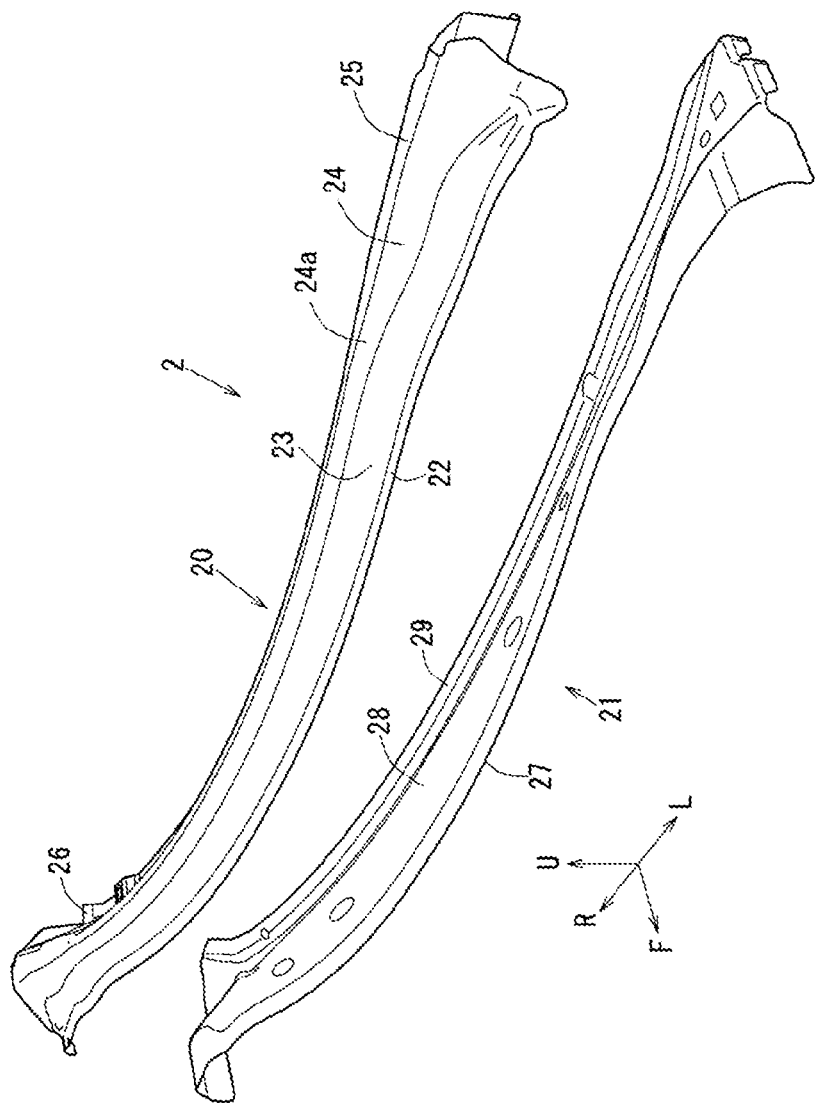
FIG. 8 is an exploded perspective view of a cowl.

As shown in FIGS. 5, 6 and 8, the cowl lower panel 21 is formed in a nearly flat-plate shape such that it closes the downwardly-opened opening of the cowl upper panel 20. Specifically, the cowl lower panel 21 comprises a front-side flange portion 27 which extends substantially horizontally in the vehicle longitudinal direction, a bottom face portion 28 which extends obliquely rearwardly-and-downwardly from a rear end of the front-side flange portion 27, and a rear-side flange portion 29 which extends substantially horizontally in the vehicle longitudinal direction from a rear end of the bottom face portion 28, which are formed integrally.

The bottom face portion 28 is, similarly to the second face portion 25, inclined over an entire length, in the vehicle longitudinal direction, thereof such that its rear side is located at a lower level than its front side, but the bottom face portion 28 has a gentler gradient than the second face portion 25. Further, as shown by the major-part enlarged portion of FIG. 5, a rear end of the bottom face portion 28 is positioned on the rearward side, in the vehicle longitudinal direction, of an upper end of the vertical-wall shaped dash-panel body portion 31.

As shown by the major-part enlarged portion of FIG. 5, a rising portion 28a which rises toward the rear-side flange portion 26 of the cowl upper panel 20 is formed at an extension portion 28r which extends rearwardly beyond the dash-panel body portion 31 (hereafter, referred to as "rearward extension portion 28r") of the bottom face portion 28.

The cowl 2 is configured such that the respective front-side flange portions 22, 27 of the cowl upper panel 20 and the cowl lower panel 21 are joined by welding, respectively, and thereby the closed-cross section portion 120 is formed as described above. That is, the closed-cross section portion 120 is formed by the front face portion 23, the first face portion 24 and the second face portion 25 of the cowl upper panel 20, and the bottom face portion 28 of the cowl lower panel 21.

The closed-cross section portion 120 of the cowl 2 is provided with a protrusion portion 120r which protrudes rearwardly from the upper end of the vertical-wall shaped dash-panel body portion 31 at a part of the closed-cross section portion 120 which is positioned on the rearward side, in the vehicle longitudinal direction, of the upper end of the vertical-wall shaped dash-panel body portion 31. This protrusion portion 120r is formed by the rearward extension portion 25r of the second face portion 25 and the rearward extension portion 28r of the bottom face portion 28. In other words, the protrusion portion 120r is formed at the position located on the rearward side, in the vehicle longitudinal direction, of a joint portion of the upper-end flange portion 32 of the dash panel 3 and the bottom face portion 28 of the cowl 2.

Thus, the closed-cross section portion 120 of the cowl 2 can provide a sufficient sectional area by forming the protrusion portion 120r at its rear part, compared to a case where the protrusion portion 120r is not formed.

Further, the rear part of the closed-cross section portion 120 of the cowl 2 is formed in a taper shape such that this rear part gradually protrudes rearwardly-and-downwardly including the protrusion portion 120r.

As shown by the major-part enlarged portion of FIG. 5, the rising portion 28a formed at the rear part of the bottom face portion 28 of the cowl lower panel 21 is positioned at a lower part of the protrusion portion 120r. While the rear part of the closed-cross section portion 120 of the cowl 2 is formed in the taper shape as described above, the length, in the vehicle vertical direction, of the protrusion portion 120r positioned around the rear end of the closed-cross section portion is secured by forming the above-described rising portion 28a.

Further, as shown by an imaginary straight line L2 in FIG. 5, a front end of the closed-cross section portion 120 of the cowl 2, i.e., the front face portion 23, is positioned slightly on the rearward side, in the vehicle longitudinal direction, of the rear end of the bonnet 5 such that the downward plastic deformation of the bonnet 5 is not hindered when the collision object (e.g., the passenger's head portion) hits against the rear portion of the bonnet 5 from the upper side. Herein, the imaginary line L2 is a straight line which extends in parallel to the vehicle vertical direction.

In the present embodiment, the front face portion 23 of the closed-cross section portion 120 extends substantially in parallel to the vehicle vertical direction. Thereby, the sufficient cross section of the closed-cross section portion 120 is secured in the vehicle vertical direction as much as possible, avoiding interference of the bonnet 5 with the closed-cross section portion 120 in the downward plastic deformation of the bonnet 5.

Herein, in the present embodiment, the cowl 2 is located below a rear end 5r of the bonnet 5, and the windshield lower edge 6a supported at the adhesion face 24a of the first face portion 24 of the cowl 2 is located below the rear end 5r of the bonnet 5 as well.

Further, as show in FIGS. 1-3, according to the front vehicle-body structure of the present embodiment, gusset members 40 are arranged at two points of the cowl 2 which divide the adhesion face 24a of the cowl 2 to the windshield lower edge 6a into three parts nearly equally in the vehicle width direction. The gusset member 40 is a rigidity improving member to improve the bending rigidity of the cowl 2.

In other words, as shown in FIGS. 1 and 3, the gusset members 40 are arranged at the two points which are positioned substantially ⅓ of a length L (see FIG. 1), in an axial direction, of the adhesion face 24*a* of the cowl 2 with the windshield lower edge 6*a*. As shown in FIGS. 2 and 3, the above-described points, in the vehicle width direction, of the cowl 2 where the two gusset members 40 are arranged are set as gusset-member arrangement positions P40.

As shown in FIG. 3, the gusset member 40 comprises a lower face portion 41 which extends in the vehicle width direction, a pair of right-and-left side face portions 42 which extend upwardly from both ends, in the vehicle width direction, of the lower face portion 41, and a pair of right-and-left upper-end flange portions 43 which extend in opposite directions, in the vehicle width direction, from respective upper ends of the pair of right-and-left side face portions 42 such that the gusset member 40 has a hat-shaped cross section.

The lower face portion 41 of the gusset member 40 is joined to the bottom face portion 28 of the cowl lower panel 21 from the upper side, and the right-and-left upper-end flange portions 43 are joined to the first face portion 24 and the second face portion 25 of the cowl upper panel 20 from the lower side.

Thus, the gusset members 40 are arranged at the gusset-member arrangement positions P40, in the vehicle width direction, of the cowl 2, and also arranged such that the closed-cross section space 2*s* of the cowl 2 which extends in the vehicle width direction is separated (closed) in the vehicle width direction at the two-point gusset-member arrangement positions P40 (see FIG. 3).

As shown in FIGS. 2-7, the front vehicle-body structure of the present embodiment comprises a bracket 50 which is provided at the central portion (6*a*C), in the vehicle width direction, of the cowl 2 (windshield lower edge 6*a*) such that this bracket 50 extends forwardly in a tongue shape.

Specifically, as shown in FIG. 5, the bracket 50 comprises a flange potion 51 which is joined to the cowl 2 and a forward extension portion 52 which extends forwardly from a front end of the flange portion 51, which are integrally made of a steel plate. As shown in FIG. 3, the bracket 50 has a length, in the vehicle width direction, thereof which is equivalent to a nearly entire part of the central portion 6*a*C of the windshield lower edge 6*a*. In the present embodiment, the central portion 6*a*C of the windshield lower edge 6*a* (i.e., the adhesion face 24*a*) means an area which corresponds to a central part of three parts into which the adhesion portion 24*a* of the cowl 2 to the windshield lower edge 6*a* is divided in the vehicle width direction (see FIGS. 2 and 3).

Figure 7:
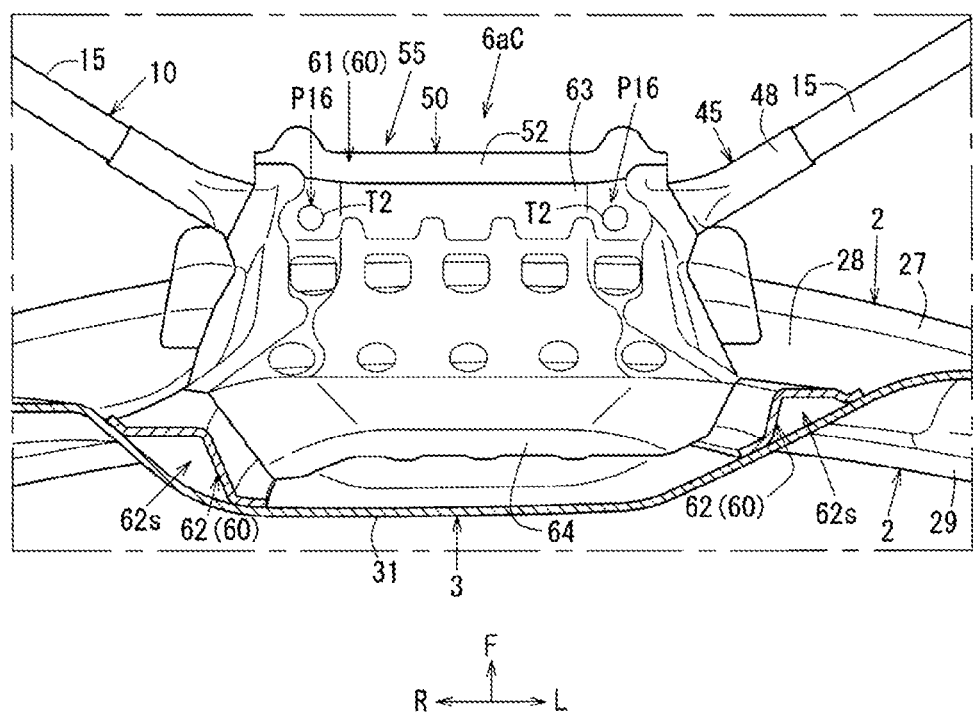
FIG. 7 is a sectional view taken along line D-D of FIG. 2.

Herein, as shown in FIGS. 4-6, the cowl 2 is provided to project forwardly relative to the dash-panel body portion 31. Therefore, as shown in FIGS. 5-7, the flange portion 51 of the bracket 50 is joined, by welding, to a front-side part of the bottom face portion 28 and the front-side flange portion 27 of the cowl 2 from the lower side at the central portion (6*a*C) of the cowl 2. Thereby, the bracket 50 is attached to the cowl 2 in a cantilever-support shape such that this bracket 50 extends forwardly from the central portion (6*a*C) of the cowl 2.

As shown in FIGS. 1-3, the tower bar 10 extends, in the vehicle width direction, over the forward extension portion 52 of the bracket 50 such that the bar central portion 16 is located above the bracket 50. Further, as shown in FIGS. 4-6, the forward extension portion 52 of the bracket 50 supports the bar central portion 16 of the tower bar 10 via a guide reinforcing member 45 from the lower side.

The guide reinforcing member 45 is configured to extend in an extension direction of the tower bar 10 over the bar central portion 16 and respective rear parts (respective inward-side parts, in the vehicle width direction) of the right-and-left bar outward-side portions 15 of the tower bar 10 (see FIGS. 1-4 and 7).

The guide reinforcing member 45 is formed in a U shape opened upwardly so that the tower bar 10 formed in the cylindrical shape can be inserted thereinto. Specifically, as shown in FIGS. 5 and 6, the guide reinforcing member 45 comprises a front face portion 46 which guides an insertion portion of the tower bar 10 into the guide reinforcing member 45 from the front side, a rear face portion 47 which guides the insertion portion of the tower bar 10 into the guide reinforcing member 45 from the rear side, and a lower face portion 48 which interconnects respective lower ends of the front face portion 46 and the rear face portion 47, which are formed integrally.

As shown in FIGS. 3, 4 and 6, the bar central portion 16 of the tower bar 10 is fixedly fastened to the bracket 50 at both-side positions, in the vehicle width direction, of the bracket 50, i.e., at the two points separated from each other in the vehicle width direction, by fastening members T2 (bolts and nuts).

The positions, in the vehicle width direction, of the bracket 50 where the bar central portion 16 is fastened are set as bar fastening positions P16.

As shown in FIG. 3, the right-and-left bar fastening positions P16 are located on the inward side, in the vehicle width direction, of the gusset-member arrangement positions P40. That is, the bar central portion 16 of the tower bar 10 is fixed via the bracket 50 between the respective positions of the two gusset members 40.

As shown in FIGS. 3, 4 and 6, the fastening portions 161 of the bar central portion 16 which are fastened to the bracket 50 are formed in a flat shape by compressively deforming the cylindrical tower bar 10 locally (i.e., by crushing the closed-cross section space 10*s* inside the tower bar 10), whereby the fastening of the toward bar 10 by means of the fastening members T2 is possible.

The bar central portion 16 of the tower bar 10 is provided to extend in the vehicle width direction along the cowl 2 in an area near a front side of the central portion (6*a*C), in the vehicle width direction, of the cowl 2. In the present embodiment, the bar central portion 16 has substantially the same length, in the vehicle width direction, as the above-described central portion (6*a*C), in the vehicle width direction, of the cowl 2.

Further, as shown in FIGS. 1-5, another portion of the tower bar 10 than the fastening portions 161 are formed, as a non-crushed portion, in the cylindrical shape without compressively deforming this portion of the tower bar 10 locally. As shown in FIGS. 3-5 particularly, the bar central portion 16 extending in the vehicle width direction maintains its cylindrical shape having the closed-cross section space 10*s* inside at its portion 162 which is interposed between the two fastening portions 161 as well.

Thus, the non-crushed portion of the tower bar 10, including the portion 162 interposed between the two fastening portions 161 of the bar central portion 16, except the flat-shaped fastening portions 161 has the higher bending rigidity than the two crushed fastening portions 161.

As described above, the guide reinforcing member 45 is provided to extend continuously in its extension direction over the fastening portions 161 and the non-crushed portion (including the non-crushed portion of the portion 162 interposed between the two fastening portions 161) and guide the tower bar 10.

Thus, by connecting the fastening portions 161 and the non-crushed portion in the extension direction of the tower bar 10 by means of the guide reinforcing member 45, the strength of the flat-shaped fastening portions 161 is secured by utilizing the strength of the non-crushing portion.

Further, as shown in FIGS. 5 and 6, a step portion 53 which is stepwise in the vehicle vertical direction is formed at a rear side (base side) of the forward extension portion 52 of the bracket 50 such that a front-side portion (tip-end side) of the forward extension portion 52 is located below the flange portion 51.

The step portion 53 is formed over an entire length, in the vehicle width direction, of the bracket 50. The backet 50 is provided with ridgelines 54u, 54d which extend in the vehicle width direction at upper-and-lower ends of the step portion 53 (the upper-end ridgeline 54u is formed at the upper end of the step portion 53 and the lower-end ridgeline 54d is formed at the lower end of the step portion 53).

Herein, as described above, the bar central portion 16 is fixed, from the upper side, to a portion of the forward extension portion 52 of the bracket 50 which is positioned on the forward side of the step portion 53. As shown in FIGS. 2, 4-7, the front vehicle-body structure of the vehicle of the present embodiment further comprises a gate-shaped reinforcing member 60 to reinforce an area 55 of the forward extension portion 52 of the bracket 50 where the tower bar 10 is fixed from the upper side (hereafter, referred to as "bar-fixation area 55").

As shown in FIGS. 2 and 4-7, the gate-shaped reinforcing member 60 comprises a vehicle-width-direction extension member 61 which extends in the vehicle width direction and a pair of right-and-eft vehicle-vertical-direction extension members 62 which downwardly extend substantially vertically from right-and-left both ends of the vehicle-width-direction extension member 61, which is formed in a gate shape which is opened downwardly in the elevational view.

As shown in FIGS. 4-7, the vehicle-width-direction extension member 61 is provided below the cowl lower panel 21 in an area located above the dash panel 3 such that this member 61 extends, in the vehicle longitudinal direction, over the cowl 2 which is provided to project forwardly beyond the dash-panel body portion 31.

Further, as shown in FIGS. 5-7, the vehicle-width-direction extension member 61 is configured such that a front-side flange portion 63 which is formed at its front end is joined, from the lower side, to the bar fixation area 55 (i.e., the front-side portion) of the forward extension portion 52 of the bracket 50 which is positioned on the forward side of the cowl lower panel 21.

Meanwhile, the vehicle-width-direction extension member 61 is configured such that a rear-side flange portion 64 which is formed at its rear end is joined, from the front side, to an upper part of the vertical-wall shaped dash-panel body portion 31 which is positioned below the cowl lower panel 21.

Thereby, as shown in FIGS. 4-6, the vehicle-width-direction extension member 61 forms the closed-cross section space 61s extending in the vehicle width direction together with the bracket 50, the cowl lower panel 21, and the dash panel 3.

Herein, as shown in FIGS. 5 and 6, the front-side flange portion 63 of the vehicle-width-direction extension member 61 is joined to the bar fixation area 55 of the forward extension portion 52 of the bracket 50 from the lower side as described above. This joint position (position of the front-side flange portion 63 in FIG. 5) and the position of the step portion 53 provided at a base-end side of the bracket 50 (i.e., the upper-end ridgeline 54u and the lower-end ridgeline 54d) are offset in the vehicle longitudinal direction.

That is, the vehicle-width-direction extension member 61 is arranged below the step portion 53 such that this member 61 extends in the vehicle longitudinal direction over the step portion 53 provided at the base-end side of the bracket 50 (i.e., the upper-end ridgeline 54u and the lower-end ridgeline 54d) and has the above-described closed-cross section space 61s extending in the vehicle width direction right below the step portion 53.

Further, as shown in FIGS. 6 and 7, at the above-described two bar fastening positions P16 are fixedly fastened, by the above-described bolts and nuts, the front-side flange portion 63 of the vehicle-width-direction extension member 61 in addition to the fastening portion 161 of the bar central portion 16 of the tower bar 10, the bottom face portion 28 of the guide reinforcing member 45, and the bar fixation area 55 of the forward extension portion 52 of the bracket 50.

As shown in FIGS. 2 and 4, the right-and-left vehicle-vertical-direction extension members 62 extend in the vehicle vertical direction so as to connect both ends of the vehicle-width-direction extension member 61 and both ends of the gate-shaped portion 4a of the dash cross member 4.

As shown in FIG. 2, the right-and-left vehicle-vertical-direction extension members 62 are located at the same positions, in the vehicle width direction as the gusset arrangement positions P40. In the present embodiment, the right-and-left vehicle-vertical-direction extension members 62 respectively extend nearly in parallel to the vehicle vertical direction in the elevational view.

The right-and-left vehicle-vertical-direction extension members 62 extend downwardly from the rear portion of the vehicle-width-direction extension member 61 which extends in the vehicle longitudinal direction below the cowl 2, and forms closed-cross section spaces 62s extending in the vehicle vertical direction together with a front face of the dash-panel body portion 31 as shown in FIG. 7.

That is, the closed-cross section space 61s of the vehicle-width-direction extension member 61 (see FIGS. 5 and 6) and the closed-cross section spaces 62s (see FIG. 7) of the right-and-left vehicle-vertical-direction extension members 62 extend continuously including the respective joint portions.

The above-described front vehicle-body structure of the vehicle of the present embodiment comprises, as shown in FIGS. 1-5, the front windshield 6 (see FIG. 5), the cowl 2 provided to support the front windshield 6 in the inclined state where the rear side of the front windshield 6 is located at the higher level than the front side of the front windshield 6 and forming the lower edge of the opening portion 14 for arranging the front windshield 6 (front-windshield opening portion), and the bonnet 5 provided in front of and above the cowl 2, wherein, as shown in FIGS. 1, 4-6 and 8, the upper face portion 2U of the cowl 2 comprises the first face potion 24 to which the front windshield 6 adheres and the inclined second face portion 25 which extends obliquely rearwardly-and-downwardly from the first face portion 24, and the front end (i.e., the front face portion 46) of the first face portion 24 is positioned on the rearward side, in the vehicle longitudinal direction, of the rear end 5r of the bonnet 5.

According to this structure, the rigidity of the cowl 2 itself can be secured and also the pedestrian-protection performance can be secured.

Figure 10:
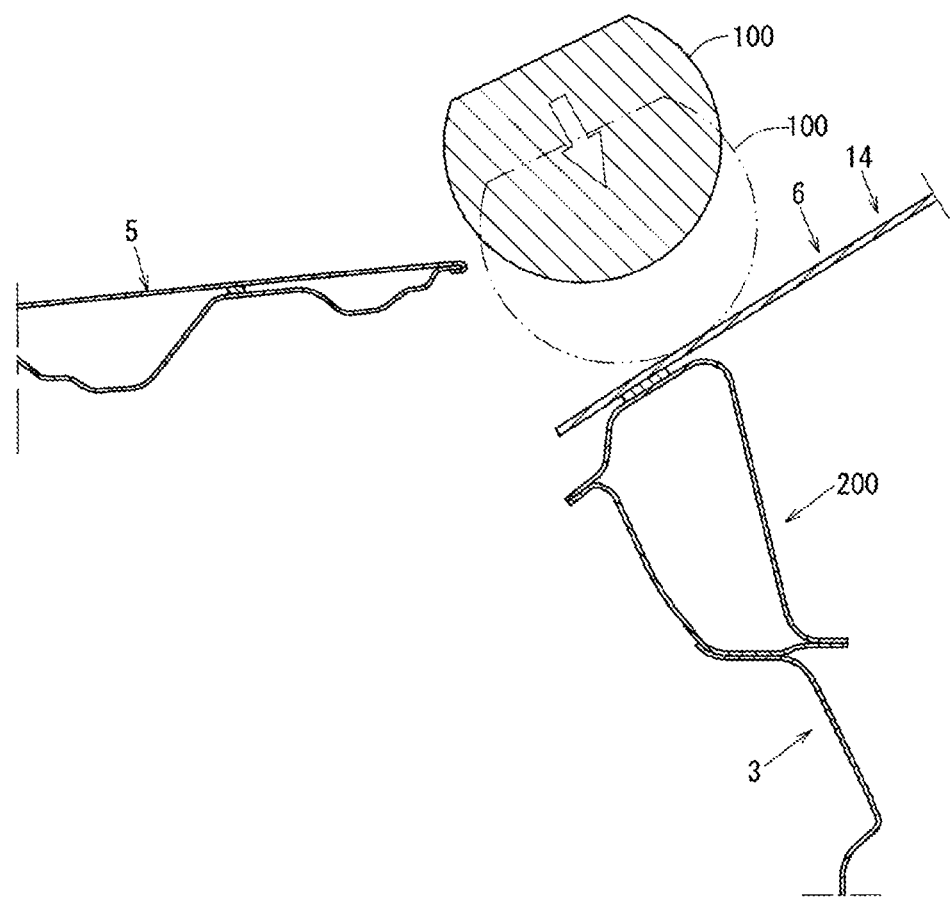
FIG. 10 is an explanatory diagram of operation of a conventional cowl.

Specifically, in the structure in which a cowl 200 has a closed-cross section structure like a conventional front vehicle-body structure shown in FIG. 10, in a case where an collision object 100, such as the head portion of the pedestrian, hits against the front portion of the front windshield 6, there is a concern that the rigidity of the cowl 200 is so high that the cowl 200 may not be crushed and deformed easily in the collision.

Meanwhile, in a case where the cowl 200 is provided with a fragile (weak) portion to cause bending of the cowl 200 (not illustrated) in order to provide easy crushing/deformation of the cowl 200 in the collision, the rigidity of the cowl 200 may improperly decrease in the normal vehicle traveling, so that there is room for further consideration.

Figure 9A:
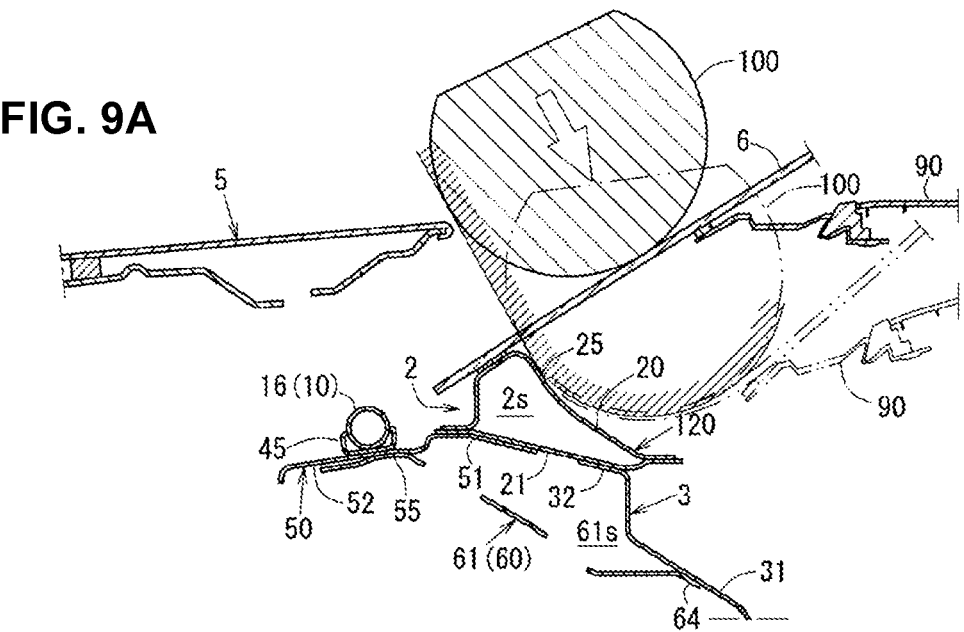
FIGS. 9A and 9B are explanatory diagrams of operation of the cowl of the present embodiment.

According to the cowl 2 of the present embodiment, however, since the second portion 25 is configured in the inclined shape such that its rear side is located at the lower level, in a case where the collision object 100, such as the head potion of the pedestrian, hits against the front portion of the front windshield 6, the collision object 100, such as the head portion, moves on the second face portion 25 obliquely rearwardly-and-downwardly as shown in FIG. 9A, so that the collision impact of the collision object 100, such as the head portion, against the cowl 2 can be reduced properly.

Figure 9B:
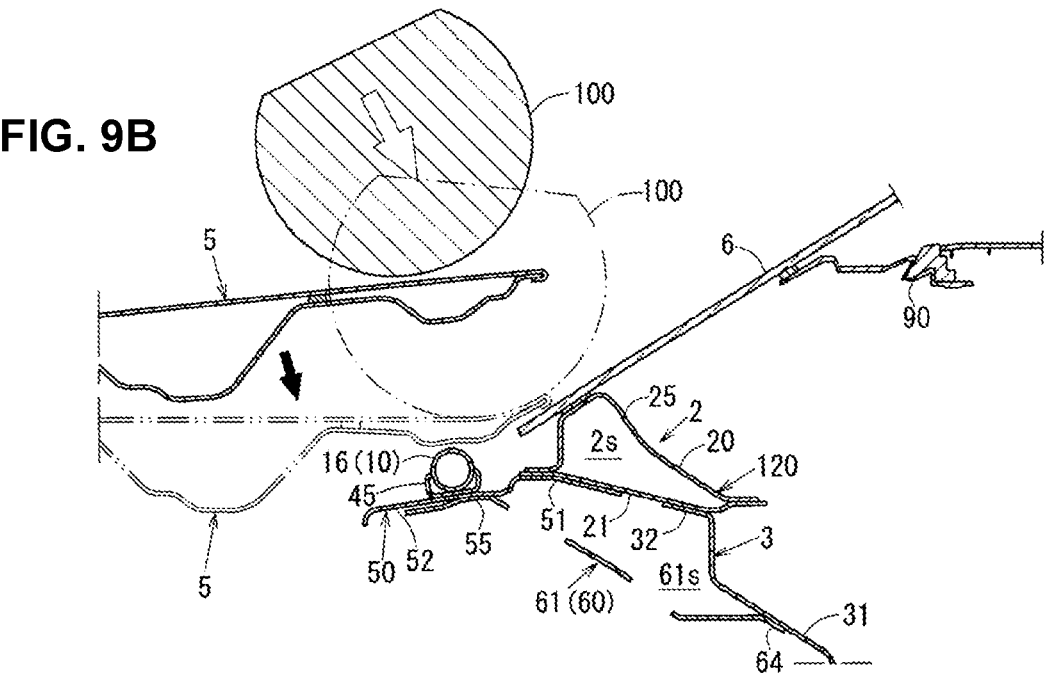

Further, since the front end of the first face portion 24 is positioned on the rearward side, in the vehicle longitudinal direction, of the rear end 5r of the bonnet 5, in a case where the collision object 100, such as the head portion of the pedestrian, hits against an area in front of the cowl 2, the downward plastic displacement of the bonnet 5 is not hindered by the cowl 2 (see a black arrow in FIG. 9B), so that the collision impact can be reduced.

That is, according to the present embodiment, the rear portion of the cowl 2 is configured to allow the collision object 100 to move rearwardly and the front portion of the cowl 2 is configured not to hinder the downward deformation of the bonnet 5, so that the pedestrian-protection performance can be secured.

Further, since it is unnecessary to configure the cowl 2 itself to be easily crushed by providing the fragile portion or the like to cause bending of the cowl 2, the rigidity of the cowl 2 itself can be secured.

Accordingly, the rigidity of the cowl itself can be secured and also the pedestrian-protection performance can be secured.

In the embodiment of the present invention, as shown in FIGS. 4, 5 and 8, the cowl 2 is configured to have the closed-cross section portion 120 extending in the vehicle width direction which is formed by the faces including the first face portion 24 and the second face portion 25.

According to this structure, the rigidity of the cowl 2 can be secured. Further, the pedestrian-protection performance can be secured as well.

In the embodiment of the present invention, as shown in FIGS. 4 and 5, the bottom face portion 28 which forms the bottom face of the closed-cross section portion 120 of the cowl 2 is configured to extend obliquely rearwardly-and-downwardly.

According to this structure, the bottom face portion 28 is configured such that its rear side is located at the lower level than its front side similarly to the second face portion 25, so that the pedestrian-protection performance can be secured, securing the rigidity of the cowl 2 by providing the sufficient sectional area, in the direction perpendicular to the vehicle width direction, of the closed-cross section space 2s of the cowl 2.

In the embodiment of the present invention, as shown in the major-part enlarged portion of FIG. 5, the front vehicle-body structure further comprises the dash panel 3 provided below the cowl 2 and to extend downwardly from the lower portion of the cowl 2, wherein the upper-end flange portion 32 (the upper end portion) of the dash panel 3 is joined to the bottom face portion 28 of the closed-cross section portion 120 of the cowl 2 from below, and the closed-cross section portion 120 is provided with the protrusion portion 120r which is configured to protrude rearwardly beyond the joint portion of the upper-end flange portion 32 of the dash panel 3 and the bottom face portion 28.

According to this structure, by providing the protrusion portion 120r at the rear part of the closed-cross section portion 120, the closed-cross section space 61s of the rear part of the closed-cross section portion 120 can be properly large.

In the embodiment of the present invention, as shown in FIG. 5, the imaginary straight line L1 connecting the lower end 25d and the upper end 25u of the second face portion 25 is configured to be substantially perpendicular to (cross) the front windshield 6.

According to this structure, the vibration of the front windshield 6 which occurs in the direction crossing the surface direction of the front windshield 6 (vibration causing the front windshield 6 to be pressed against and separated from the adhesion face 24a repeatedly) can be properly suppressed by the second face portion 25.

In the embodiment of the present invention, as shown in FIGS. 5 and 8, the front face portion 23 of the cowl 2 is configured to extend downwardly from the front end of the first face portion 24 in the vertical-wall shape.

According to this structure, the plastic deformation, in the downward direction, of the bonnet 5 is not hindered and the sufficient sectional area, in the direction perpendicular to the vehicle width direction, of the closed-cross section portion 120 can be properly provided.

The present invention is not limited to the above-described embodiment but any other medications can be applied.

What is claimed is:

1. A front vehicle-body structure of a vehicle, comprising:
a front windshield;
a cowl provided to support the front windshield in an inclined state where a rear side of the front windshield is located at a higher level than a front side of the front windshield and forming a lower edge of an opening portion for arranging the front windshield;
a bonnet provided in front of and above the cowl; and
a dash panel provided below said cowl and to extend downwardly from a lower portion of said cowl,
wherein said cowl comprises a first face potion to which said front windshield adheres and an inclined second face portion which extends obliquely rearwardly-and-downwardly from said first face portion, and a front end of said first face portion is positioned on a rearward side, in a vehicle longitudinal direction, of a rear end of said bonnet,
wherein said cowl is configured to have a closed-cross section portion extending in a vehicle width direction which is formed by faces including said first face portion and said second face portion,
wherein a bottom face portion which forms a bottom face of said closed-cross section portion of the cowl is configured to extend obliquely rearwardly-and-downwardly, and wherein an upper end portion of said dash panel is joined to said bottom face portion of the closed-cross section portion of the cowl from below, and said closed-cross section portion is provided with a protrusion portion which is configured to protrude rearwardly beyond a joint portion of said upper end portion of the dash panel and said bottom face portion.

2. The front vehicle-body structure of the vehicle of claim 1, wherein an imaginary straight line connecting a lower end and an upper end of said second face portion is configured to cross said front windshield.

3. The front vehicle-body structure of the vehicle of claim 2, wherein a front face portion of said cowl is configured to extend downwardly from said front end of the first face portion in a vertical-wall shape.

4. The front vehicle-body structure of the vehicle of claim 1, wherein a front face portion of said cowl is configured to extend downwardly from said front end of the first face portion in a vertical-wall shape.

* * * * *